2 Sheets—Sheet 1.
F. PRINZ.
Assignor of one-fourth to J. K. GEHRIG.
MIDDLINGS PURIFIER.
No. 10,591. Reissued Apr. 28, 1885.
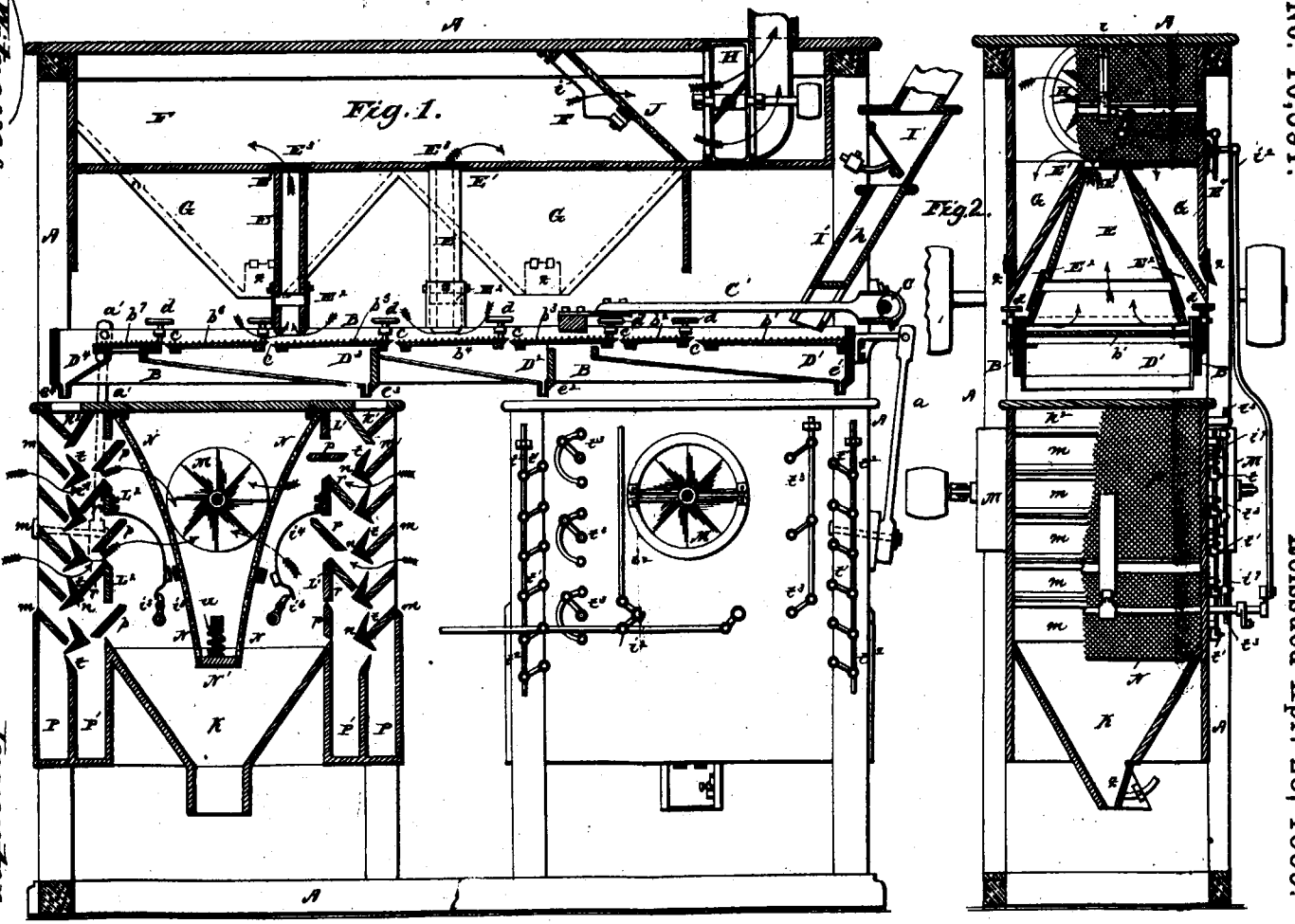
Witnesses
Franklin H. Hough
Inventor.
Faustin Prinz,
by Chas. G. Henderson
Attorney.

F. PRINZ.
Assignor of one-fourth to J. K. GEHRIG.
MIDDLINGS PURIFIER.
No. 10,591. Reissued Apr. 28, 1885.
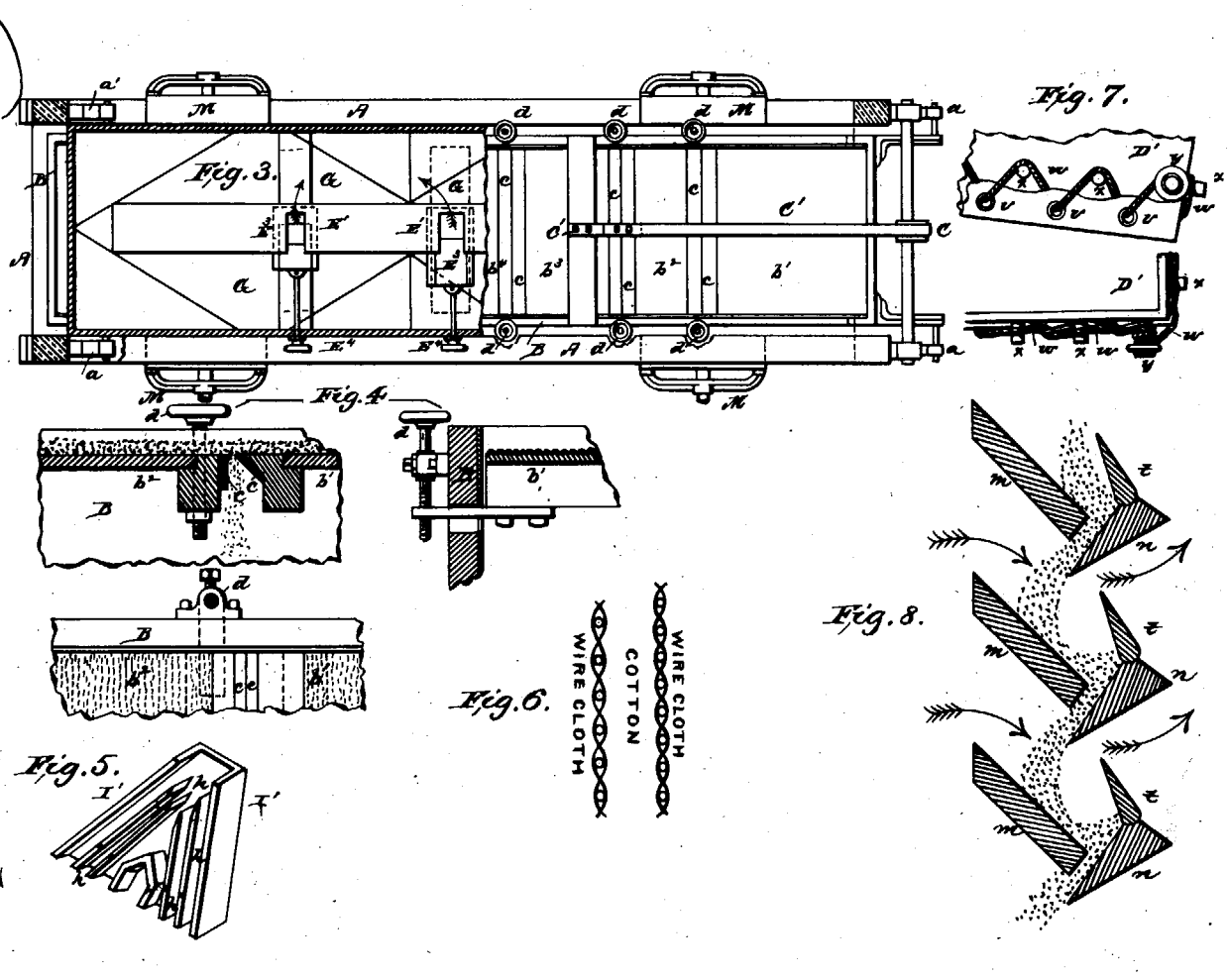
Witnesses
Wm. L. Sudue
Franklin H. Hough
Inventor
Faustin Prinz
by Chas. E. Anderson
Attorney.

UNITED STATES PATENT OFFICE.

FAUSTIN PRINZ, OF MILWAUKEE, WISCONSIN, ASSIGNOR OF ONE-FOURTH TO JOSEF K. GEHRIG, OF DUNDAS, MINNESOTA.

MIDDLINGS-PURIFIER.

SPECIFICATION forming part of Reissued Letters Patent No. 10,591, dated April 28, 1885.

Original No. 272,475, dated February 20, 1883. Application for reissue filed March 18, 1885.

*To all whom it may concern:*

Be it known that I, FAUSTIN PRINZ, a subject of the Emperor of Germany, residing at Milwaukee, in the county of Milwaukee and State of Wisconsin, have invented certain new and useful Improvements in Middlings-Purifiers, of which the following is a specification, reference being had therein to the accompanying drawings.

My invention relates to middlings-purifiers; and it consists in the construction and the combination of parts, hereinafter particularly described, and then specifically defined by the claims.

I attain my proposed objects by the mechanism illustrated in the accompanying drawings, in which—

Figure 1 is a sectional side elevation. Fig. 2 is a sectional end elevation. Fig. 3 is a sectional plan view; Fig. 4, detail views enlarged of the knife-edged sections of the shaker-frame; Fig. 5, a perspective view detached of the chop-spreading feed-spout; Fig. 6, a cross-section enlarged illustrating the manner of forming the dust-catching diaphragm; Fig. 7, a side elevation and plan view enlarged of a portion of the hoppers of the shaker-frame, showing the manner of securing and stretching the cloth bottom thereon; Fig. 8, enlarged end sections of three of the zigzag chutes, illustrating the manner in which the middlings pass through them.

A is the casing or frame, in which a second frame, B, is mounted upon springs $a$ $a'$, and adapted to be moved back and forth by an eccentric, C, and connecting-rod C'. Across this frame B, a short distance below the top, are plates or sections $b'$ $b^2$ $b^3$ $b^4$ $b^5$ $b^6$ $b^7$, with the edges next each other armed with sharp metal knives or plates $c$, so arranged that when the sections $b$ are placed on the same plane the knife-edges will be in contact and completely close the joints between them. The first section, $b'$, will be stationary, while the second section, $b^2$, will be stationary at the end next the section $b^3$, and adjustable by set-screws $d$ at the end next the section $b'$, so that the knife-edges may be separated slightly, as shown in Figs. 1 and 4. The end of the third section, $b^3$, next the second section, $b^2$, will be adjustable by a set-screw, $d$, like section $b^2$, while the other end next the section $b^4$ will be stationary, and so on throughout the whole number, so that the knife-edge joints between the sections may be adjusted as shown, the object to be hereinafter explained. Beneath the first two sections, $b'$ $b^2$, an inclined spout or hopper, D', is arranged and provided with an outlet, $e'$, while a similar hopper, $D^2$, with an outlet, $e^2$, is arranged beneath the sections $b^3$ and $b^4$, and a third hopper, $D^3$, is similarly arranged beneath sections $b^5$ $b^6$, and a fourth hopper, $D^4$, with an outlet, $e^4$, being arranged back of the section $b^7$ for the tailings. Each of the sections $b$ will be made of wooden or metal plates, and covered with bolting-cloth or similar substance glued fast thereto to give it a rough surface to cause the chop to travel over the surface more readily.

Above the shaker-frame B, at suitable points, narrow spouts E are arranged, any desired number being used, but only two being shown in the present instance. These spouts are made the full width of the shaker-frame at the bottom, but are inclined inward toward their tops E'. They run up for about one-half the distance between the shaker-frame B and the top of the casing A, and have exit into an air-chamber, F. The lower part of this air-chest is formed into pockets or hoppers G, to receive the bran and dust and convey it from the machine.

H is a fan to form a suction in the air-chamber F and through the spouts E.

I is the feed-hopper, provided with an adjustable valve, $g$, whereby the feed may be regulated, and ending in a flaring spout, I', whose lower edge extends the full width of the shaker-frame and terminates above it, near the front end of the first section, $b'$. On the inside of this flaring spout I' inclined ribs or blades $h$ are arranged (see Fig. 5) by set-screws, so that they may be adjusted, and with their upper points terminating at equal distances apart beneath the hopper I, while their lower ends spread out at equal distances apart along the flaring edge, so that the falling "chop" from the hopper will be caught by the ribs $h$ and spread evenly upon the full width of the shaker-frame.

J is a dust-catching screen between the fan

H and the air-chamber F, formed of unwoven cotton in the form of batting or sheets supported by coarse-meshed wire-cloth. This allows the air to pass freely through it, but catches and retains all dust and chaff.

A knocker or hammer, $i$, will be arranged to be operated by a trip, $i'$, connected to the operating mechanism of the machine, as shown in Figs. 1 and 2, at $i^2$, to strike the dust-catcher at intervals to shake the adhering dust loose and prevent clogging. This knocker, as well as knockers $i^3$ $i^4$, hereinafter described, is arranged, as shown, on the side of the dust-catcher or screen against which the dust-laden air is impelled. By so arranging the knockers they are caused to strike the dust-collector in a line parallel, or substantially so, with the pores of the collecting medium and push it in the direction that the dust is carried, so that the jar that detaches the dust from the collector moves the cloth or collector away from the dust and not toward it, whereby a better separation of the dust from the collector is effected. When the blow is in the other direction, or against the air-current, the dust is driven into the meshes of the collector, the separation is more difficult, and the closing of the meshes more rapid.

Across the machine, beneath each of the outlets $e'$ $e^2$, &c., V-shaped troughs $k'$ $k^2$ are arranged and provided with narrow slits at their bottoms, through which the middlings escape.

Beneath the right side of the trough $k'$ and the left side of the trough $k^2$, and running parallel with them, rows of inclined slats or chutes $m$ are arranged at equal distances apart and of any desired number, five being shown.

A short distance from the lower edges of the slats $m$ angular or prismatic slats or bars $n$ are arranged with their upper surfaces parallel with and in a line beneath the left side of the trough $k'$ and the right side of the trough $k^2$, the two series of slats thus forming troughs similar to the troughs $k'$ $k^2$.

$L'$ $L^2$ are two partitions between the two sets of troughs $m$ $n$, and connected to each other by a hopper, K, at the bottom. These partitions are pierced at equal distances apart opposite every other one of the sets of troughs $m$ $n$, and provided with adjustable valves $p$ and inclined projecting chutes $r$, running down toward and nearly to every other one of the angular slats $n$.

Above each of the angular slats $n$ small sharp-edged wings or dividers $t$ are pivoted, and extending upward about two-thirds ($\frac{2}{3}$) of the distance between the slats $n$, and made adjustable by means of arms $t'$, connected to a rod, $t^2$, outside the frame-work, as shown in Figs. 1 and 2. The upper edges of these dividers $t$ are below the levels of the upper edges of shelves or chutes $m$.

On opposite sides of the casing A, in the center between the partitions $L'$ $L^2$, fans M are arranged, adapted to draw the air inward through the spaces between the chutes $m$ $n$ and wings $t$, as shown, and discharge it out through the fans.

Between the partitions $L'$ $L^2$ and fans M walls N of the dust-catching screens (shown in Fig. 6) are arranged and provided with knockers $i^3$ $i^4$, operated by trips $i^5$ $i^6$ through rods $i^7$ on the outside of the casing, the sets of hammers $i$ $i^3$ $i^4$ being tripped by one operation. These walls N will converge at the bottom and be connected to a cross-bar, N', provided with a spring, $u$, to keep them stretched and to prevent sagging.

Beneath the hoppers $D'$ $D^2$ a similar system of troughs, $k$ $m$ $n$, and fans and dust-catchers N, are arranged, Fig. 1 representing the exterior of one set and the interior of the other, or any desired additional number may be used.

The operation of the apparatus is as follows: The chop being fed in an even stream upon the first section, $b'$, of the shaker-frame B, is caused to travel downward toward the tail-hopper $D^4$ in a thin even sheet over every part of the surface of the sections. This agitation causes the light particles of bran, &c., to rise to the surface, while the smaller particles of fine middlings and dust are precipitated to the bottom, the intermediate space being occupied by the coarse middlings. Thus the mass is automatically arranged in three regular layers, varying in thickness according to the condition of the chop. It will also be observed that the first section, $b'$ is somewhat longer than the others, to give time for a partial separation into the layers before the mass reaches the first knife-edged joint $c$, so that a quantity of the fine middlings will be precipitated down next the section $b'$ before it reaches the first joint $c$. At this point the adjustable knife-edge $c$ on the second section, $b^2$, will be so set that the joint will be opened just the thickness, or a trifle less than the thickness, of the lower layer of fine middlings, so that when the mass passes over the joint the lower layer will be cut off and carried down into the hopper $D'$, while the coarse middlings and bran only will pass over, and then by the time the second joint is reached another layer of fine middlings will have been precipitated and will be cut off and carried down into the same hopper, and so on throughout the whole number of sections. When the mass reaches the first spout E, the suction will gather the bran up into a ridge beneath it, and when it has nearly or quite choked the spout the whole will be carried up and blown into the dust-chamber F, where, the air having less power over each individual particle, the heavy dust and bran will fall into the pockets G, while the fine dust only will be carried against the diaphragm J, where it will be caught and held until knocked loose by the hammer $i$, as before described. Should any of the bran escape the first suction-spout E, it will be caught by the second one. Hence by the time the sheet of chop reaches the tail-section $b'$ nothing remains but very coarse middlings and heavy bran. By this simple means the fine middlings are separated from the coarse, and the bran separated from both.

The outlets $e'$ $e^2$, &c., from the hoppers D, it will be observed, are very narrow. Hence only a very thin wide stream of middlings will be fed to the troughs $k$, and the outlets will be in the form of a spout, as shown, their lengths—that is, their cross-measurement in the line of the length of the machine—corresponding to the length of stroke of the shaker-frame B, that for a one-inch stroke being about one and one-half inch long, and increasing or decreasing as the stroke is lengthened or shortened.

The exit-slots $e$, it will be observed, are not quite down to the extreme ends of the hoppers D, but a small space is left to be occupied by an inclined-topped strip.

When the middlings are thrown forward by the movement of the shakers and hoppers, they will pile up above the slots $e$, and not all pass through at once, so that a portion is left to run through the slot at the backward stroke, which the inclined form of the top of the filling-strip assists them in doing, thereby insuring a flow of middlings through the slots $e$ at both the forward and backward strokes of the shaker and hoppers and producing a steady flow, which is the great desideratum in this class of machines to secure a uniform action of the air.

The inner sides of the troughs $k'$ $k^2$ and the outer sides of the angular or prismatic slats $n$ lap down beneath the outer sides of the troughs $k$ and slats $m$, as shown, to cause the middlings to be thrown by their momentum well upward upon the slats $m$, (see Fig. 8,) so as to increase the angles of their zigzag course, and present the stream at right angles to the incoming air-currents, and aid in the more thorough separation of the coarse from the fine.

When running down the inclines $m$ $n$, the fine middlings and dust will be precipitated to the bottom of the stream and the coarse particles rise to the surface, and then when the whole runs down over the points of the inclined slats $n$ and drops to the next incline $m$ the coarse particles will be toward the outside, and the fine particles toward the inside, of the machine.

Less power of suction is required to move the fine particles than to move the coarse particles; hence, if the currents flowing inward are just strong enough to pick off the inner layer of fine particles, the coarse particles will be unaffected and drop into the hoppers P P, while the fine particles and dust only will be carried over the wings or dividers $t$. By thus arranging the coarse middlings toward the inflowing current of air a more perfect action of the latter is obtained, as the fine middlings are simply picked off from the coarse ones and not brought in contact with them again. If the air-currents flowed in the opposite direction, or if the middlings were not separated into layers, the fine particles would be blown in contact with the coarse particles, and a perfect separation prevented. In the meantime the current of air, with the finer middlings and dust, having entered the larger space between the partitions L' L² and the slats $n$, the air will have less effect upon the individual particles; hence the heavier middlings will fall down into the hoppers P' through the spaces between the slats $r$ and rear sides of the angular slats $n$, leaving only the fine dust to be carried through the valves $p$ into the hopper K.

As before described, when the middlings are passing downward through the zigzag course the finer particles are next the suction-fan; hence it will not be necessary for the air-current to carry them through the mass, but to simply pick them off, thus greatly facilitating the action and preventing the possibility of the current carrying with it any of the good middlings. This is a very important point in my invention.

The spaces between the slats $n$ and $m$ and $r$ are very narrow, being just as small as it is possible to make them and permit the flow of middlings, so that none of the currents of air can pass up through them; hence the separation is conducted entirely while the middlings are falling from one set of inclines to another, and are separated into the two layers of coarse and fine middlings, as before described. Another great advantage of this arrangement is that the air passes through the stream of middlings only at right angles to them, thus insuring the more perfect separation, as no danger exists of mixing the coarse and fine middlings by carrying the particles upward or downward against each other.

The wings $t$ and valves $p$ will be adjustable from outside the machine, as shown by rods $t^3$, (see Figs. 1 and 2,) to regulate and control the air-currents. The bottoms of the spouts E will be provided with adjustable sleeves E², to adjust them to the condition or quantity of bran or chop running through the machine, while valves E³, operated by rods E⁴ from the outside, enable me to control the suction of the fan H. The springs $a$ $a'$, upon which the shaker-frame B is mounted, are set with a forward slant, so that the shaker will be given a slight rising and forward movement and a falling and backward movement to assist the chop in its traveling over the sections, and cause the bran, &c., to rise to the surface more readily. The wings $t$ will also be utilized to aid in the separation of the coarse layer from the fine layer as the middlings drop from the points of the angular inclines $n$ by being turned outward to divide the stream between the layers under some circumstances.

Under some circumstances some of the knife-edge joints $c$ may be closed by setting the two sets of blades opposite each other when chop requiring more time to separate its particles is being purified.

The extreme delicacy of adjustment required of the knife-edged joints renders it necessary to provide each hopper $D' D^2 D^3$ with two sections, so that what one fails to cut off the other will.

The bottoms of the hoppers D will be covered with cloth having eyelets $v$ around its edges, through which cords $w$, running over pins $x$, are run and tightened up by a screw, $y$, (see Fig. 7,) whereby they may be kept stretched tight, and thus produce a hopper that will be very light and strong. This method of tightening the cloth I now elect to claim in my application filed July 23, 1881, Serial No. 38,437.

The mouths of the hoppers G and the spouts to the hopper K will be provided with valves $z$, to prevent the air being drawn in at these points and interfering with the operation of the machine. The edges of the shaker-frame B with which the chop and middlings come in contact will be covered with sheet metal to prevent wear. The fans H M, it will be observed, are made with screw-shaped blades, as more effective work can be accomplished with this form than with the ordinary fan, and with less expenditure of power. The dust-chamber F may be dispensed with, and the spouts E conducted into one common trunk, and from thence into a dust-room. By these simple arrangements the use of the expensive bolting-cloth for the shaker-frame is dispensed with.

A great advantage is gained by using the narrow suction-spouts E, as only a very small amount of suction is required. Curving the dust-catcher N inward is advantageous, as when the dust is shaken loose by the knockers it will fall directly into the hopper K and not catch upon some other part of the surface of the catcher.

The use of unwoven loose cotton as dust-catchers in mills is much more effective than woven cloth, as being without strands or yarns no regular square holes occur, as in cloth, but the loose fibers cross and recross each other in such an interminable manner as to be certain to catch every particle of dust.

Having thus described my invention, what I claim as new is—

1. The combination, with a shaker-frame, B, adapted to be agitated, of sections $b' b^2 b^3 b^4 b^5 b^6 b^7$, with their edges armed with sharp blades $c$ and made adjustable vertically, substantially as set forth.

2. The combination and arrangement of the shaker-frame B, adapted to be agitated, the adjustable knife-edge sections $b' b^2 b^3 b^4 b^5 b^6 b^7$, and the suction-spouts E, substantially as set forth.

3. The combination, with a shaker-frame, B, adapted to be agitated, and the adjustable knife-edged sections $b' b^2 b^3 b^4 b^5 b^6 b^7$, of the hoppers $D' D^2 D^3 D^4$, substantially as set forth.

4. The vibrating hopper D′, provided near its lower end with a pendent exit-spout, $e$, and a beveled block or strip, as shown, against the lower end of the hopper, as and for the purpose specified.

5. The shaker-frame B, provided with knife-edge sections $b' b^2 b^3 b^4 b^5 b^6 b^7$, in combination with a rough-surfaced covering to the said sections to assist the chop in traveling over their surfaces, substantially as set forth.

6. In a middlings-purifier, the slats $m$ and $n$ and inclined chutes $r$, forming a series of troughs, arranged as shown, in combination with hoppers P, P′, and K, partitions L L′, and fan M, the several parts being adapted to operate as set forth.

7. The combination, with the hoppers $D' D^2 D^3 D^4$, of cloth bottoms thereof, and eyelets $v$, and cords and pins $w x$, substantially as set forth.

8. In middlings-purifiers, the combination, with an agitating-frame, of a sectional bottom, the sections thereof being arranged so that from front to rear of the frame the rear edge of one section will be lower than the front edge of the next section, whereby as the frame is agitated the middlings will be passed from front to rear in layers, and the lower layer cut off from the upper and passed down beneath the sections, as set forth.

9. The combination of a side casing, the vertical series of prismatic bars $n$, and pivoted dividers $t$, inclined shelves or chutes $m$, arranged to leave spaces between their lower ends and the bars $n$ for the passage of the chop down onto the next lower chute $m$, and having their upper ends above the level of dividers $t$, and means, substantially as set forth, for creating an air-current whereby the middlings are caused to take a zigzag course, and the air-currents are compelled to descend through the middlings at right angles thereto, for the purpose set forth.

10. The combination of a side casing, a vertical series of prismatic or angular bars, $n$, and pivoted dividers $t$, inclined shelves or chutes, $m$ arranged to leave spaces between their lower ends and the bars $n$ for the passage of the chop down onto the next lower chute $m$, and means, substantially as set forth, for creating an air current, whereby the middlings are caused to take a zigzag course and the air-currents are compelled to pass through the middlings at right angles thereto, for the purposes set forth.

11. The combination of a trough having an inclined side with its lower edge extending beyond the end of the opposite side, and a space between the two sides for the passage of chop, inclined chutes or shelves arranged one above the other, a vertical series of prismatic or angular bars $n$, having their lower ends extended beyond the ends of the opposite inclined chutes to direct the flow of chop onto the chute next below, and pivoted dividers above said angular bars, whereby the middlings are caused to take a zigzag course with the coarse particles on one side and the fine particles on the other, and means, substantially as described, for creating an air-current to pass through the stream from the side having the heavier particles, substantially as described.

12. The combination of a dust-collecting fabric or medium, a fan, a knocker located and operated to strike the collecting medium from the side against which the dust is driven in a line parallel, or substantially so, with the pores of the collecting medium, substantially as and for the purpose set forth.

In testimony whereof I affix my signature in presence of two witnesses.

FAUSTIN PRINZ.

Witnesses:

JOHN M. CONNOLLY,

A. J. GRUNDMAM.